C. W. STARK.
COMBINED GRASS GRUBBER AND CULTIVATOR.
APPLICATION FILED OCT. 20, 1908.
930,996.
Patented Aug. 10, 1909.
2 SHEETS—SHEET 2.
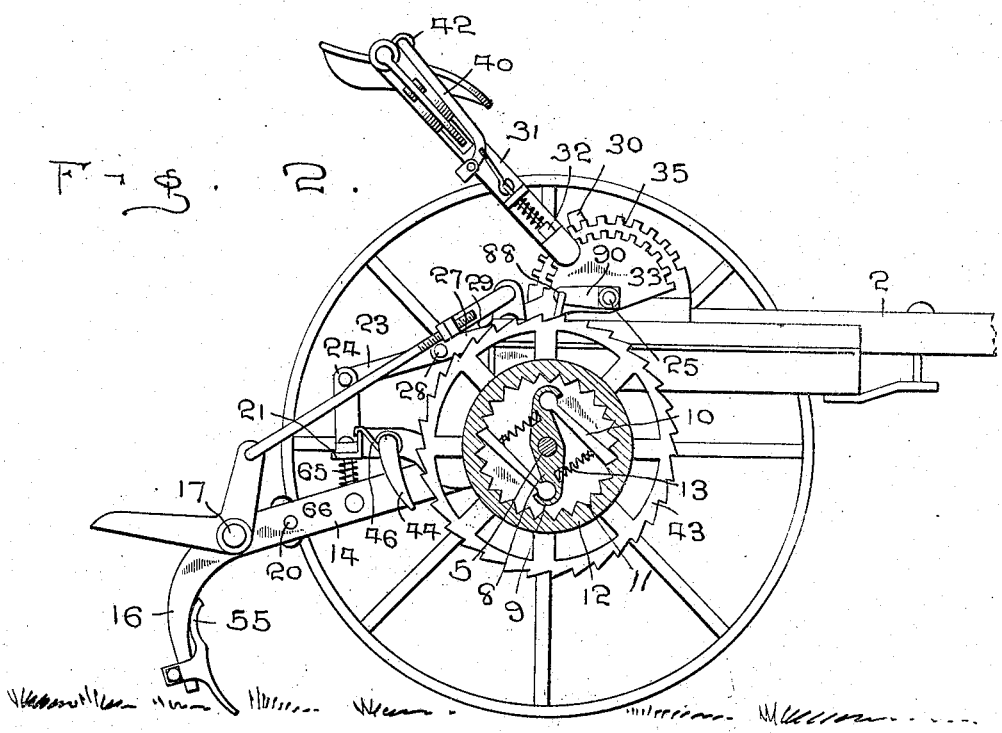
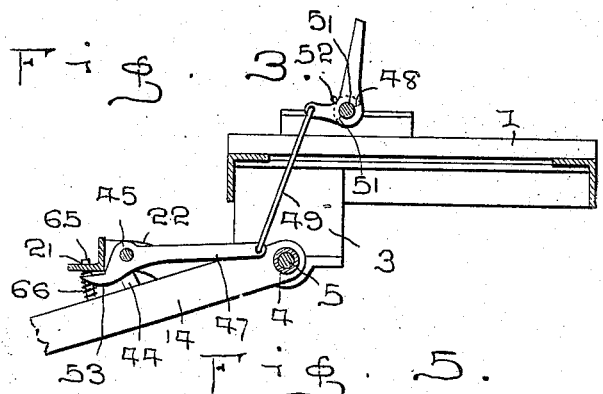
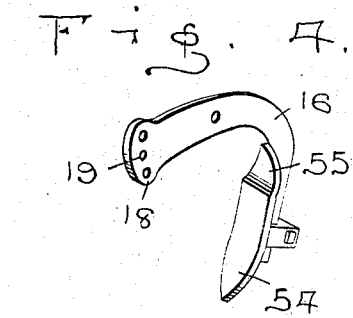
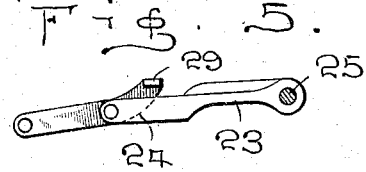
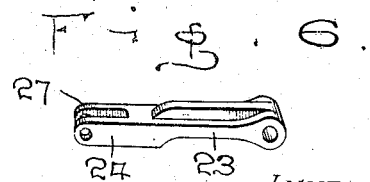
WITNESSES:
Thos. W. Riley
M. A. Newcomb
INVENTOR
C. W. Stark
BY W. J. FitzGerald
Attorneys

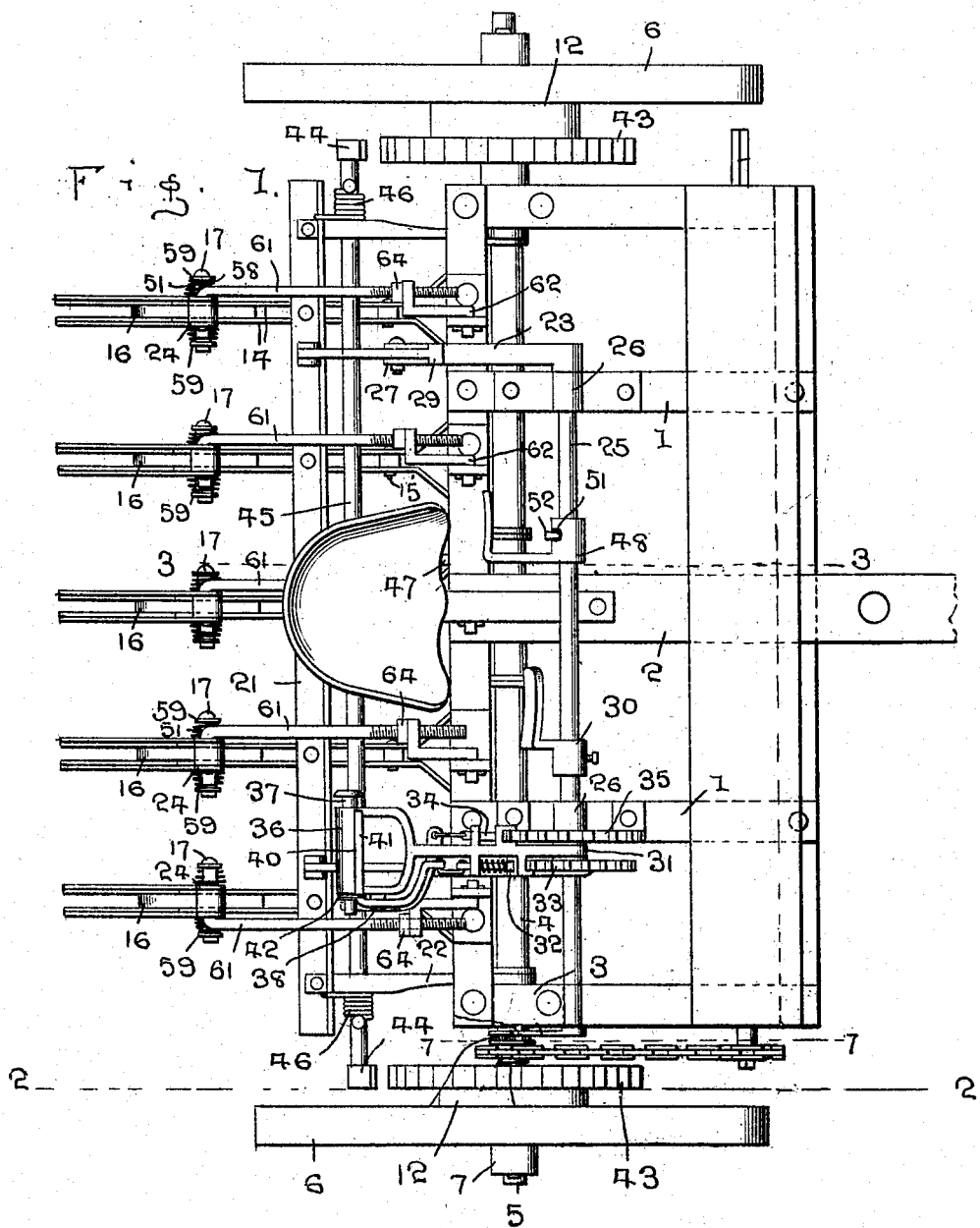

UNITED STATES PATENT OFFICE.

CHARLIS W. STARK, OF MOUNTAIN LAKE, MINNESOTA.

COMBINED GRASS-GRUBBER AND CULTIVATOR.

No. 930,996.  Specification of Letters Patent.  Patented Aug. 10, 1909.

Application filed October 20, 1908. Serial No. 458,660.

*To all whom it may concern:*

Be it known that I, CHARLIS W. STARK, a citizen of the United States, residing at Mountain Lake, in the county of Cottonwood and State of Minnesota, have invented certain new and useful Improvements in Combined Grass-Grubbers and Cultivators; and I do hereby declare the following to be a full, clear, and exact description of the invention, such as will enable others skilled in the art to which it appertains to make and use the same.

My invention relates to new and useful improvements in combined grass grubbers and cultivators and my object is to provide a device of this class which will remove and destroy vegetation such as quack grass or the like.

A further object is to so arrange the parts of the device that the soil will be cultivated at the time of destroying the vegetation.

A further object is to provide means for manually or automatically raising the cultivating attachments out of engagement with the earth's surface.

A further object is to provide means for normally holding the cultivating attachments in engagement with the earth's surface.

A still further object is to provide a shovel which will permit the grass, etc., to fall back into the furrow made by the shovel.

Other objects and advantages will be hereinafter referred to and more particularly pointed out in the claims.

In the accompanying drawings which are made a part of this application, Figure 1 is a top plan view of the cultivator. Fig. 2 is a sectional view as seen on line 2—2, Fig. 1. Fig. 3 is a sectional view as seen on line 3—3, Fig. 1. Fig. 4 is a perspective view of one of the cultivator shovels and supporting shank for the same. Fig. 5 is a side elevation of one of the bars employed for holding the cultivating devices in engagement with the earth's surface. Fig. 6 is a detached perspective view of the bifurcated ended member or section of one of the reach suspending bars.

Referring to the drawings in which similar reference numerals designate corresponding parts throughout the several views, 1 indicates the frame of my improved cultivator, which is preferably oblong, as shown, and 2 indicates the usual or any preferred form of tongue employed for guiding the cultivator.

Depending from each end bar of the frame is a block 3, to the lower ends of which are secured a tubular shaft 4, said shaft extending the full length of the frame 1 and is adapted to form a bearing for the axle 5, said axle being rotatably mounted in said shaft, the ends of the axle 5 extending beyond each end of the shaft 4 and having mounted thereon supporting wheels 6.

The inner ends of the hubs 7 of the wheels 6 have fixed thereto an oblong extension 8, each end of the extension being provided with a socket 9, in which are pivotally secured the ends of the locking dogs 10, the outer ends of said dogs being adapted to engage the notches 11 on the inner wall of a hollow drum 12, said dogs being yieldingly held in engagement with said notches by means of springs 13 interposed between the free ends of the dogs and the faces of the extension 8.

The drums 12 are fixed to the axle 5 in any preferred manner and are located between the ends of the frame 1 and the wheels 6, and said drum and axle are caused to rotate with the wheels when the cultivator is moving forward, while in view of the arrangement of the dogs and notches coöperating therewith, either or both of the wheels may be rotated rearwardly without effecting the rotation of the axle.

Rotatably mounted upon and extending rearwardly from the tubular shaft 4 are a plurality of beams 14, said beams being preferably formed of two paralleling bars, which are secured together in any preferred manner, as by means of bolts 15, the rear ends of said beams having shanks 16 secured therebetween by introducing a bolt 17 through the extreme rear ends of the beams and interposed portion of the shank 16 and in order to normally hold the shanks in fixed relation with the beams, the forward ends of the shanks are provided with oblong heads 18, which heads are provided with a plurality of openings 19, through which are extended pins 20 and by extending the ends of the pins through registering openings in the bars forming the beams 14, it will be readily seen that the shanks 16 may be disposed at various angles and normally held in fixed relation with the beams.

The pins 20 are preferably formed of wood so that when a solid object is encountered the pin will break and permit the shank to pivot on the bolt 17, thereby preventing any possibility of the shank becoming bent or broken, although it will be understood that said pins may be of metal, if desired.

The beams 14 are suspended from a reach bar 21, which reach bar is in turn fixed to the outer ends of arms 22, the inner ends of said arms being likewise rotatably mounted on the tubular shaft 4 and in order to raise and lower the reach bar 21 and the beams secured thereto, I provide a pair of suspension bars 23, the rear ends of which are pivotally secured to standards 24 on the reach bar 21, while the forward ends thereof are fixed to an operating shaft 25 rotatably mounted in suitable bearings 26 on the frame 1 and it will be readily seen that when the shaft 25 is rotated, the reach bar 21 and parts carried thereby will be raised or lowered.

To obtain a more perfect leverage and lessen the amount of energy required to raise the reach bar, the suspension bars 23 are formed in two sections, the forward section having a bifurcated end 27, which is adapted to receive the forward end of the other section and the two sections are pivotally secured together in any preferred manner as by means of a pin 28 and in order to limit the downward movement of the reach bar 21, the forward ends of the rear sections of the bars 23 are provided with overhanging lugs 29, which lugs are adapted to extend over and engage the upper edge of the bifurcated end 27, by which arrangement the two sections of the suspension bars will become rigid with each other when the reach bar has been lowered a certain distance. As soon, however, as power is applied to rotate the shaft 25, the bifurcated end of the forward section of the suspension bars 23 will first swing upwardly and then elevate the reach bar through the medium of the standards 24 and rear sections of the suspension bars 23, said rear sections forming connecting links between the bifurcated ends of the forward sections of the suspension bars and the standards thereby lessening the amount of power required to rotate the operating shaft.

The operating shaft 25 has secured thereto a foot lever 30, so that the operating shaft 25 may be operated by the attendant directing pressure thereon with the foot and it will be readily seen that the reach bar and parts carried thereby may be held in their elevated positions as long as forward pressure is directed on the foot lever. The shaft 25 may also be operated by hand and in this instance a lever 31 is rotatably mounted on the shaft 25 adjacent one of the bearings 26, said lever having a latch 32 mounted thereon, which is adapted to engage a rack bar 33 on the forward end of one of the sections of the suspension bar 23 and by extending said latch into engagement with the rack bar and moving the lever 31 forwardly and rearwardly, the reach bar and parts carried thereby will be raised and lowered accordingly. The lever 31 also carries a latch 34, which is adapted to coöperate with a rack bar 35 fixed on one of the bearings 26, whereby the reach bar and parts carried thereby may be held in their elevated position, it being understood of course that the latch 34 is disengaged from the rack bar 35, while the lever 31 is being operated.

The upper end of the lever 31 is provided with a handle 36, through which extends a plunger 37, one end of the plunger having secured thereto one end of a link 38, said link being pivotally secured between ears 39 on the lever 31 and has its lower end connected in any suitable manner to the latch 34 and by this construction it will be readily seen that when it is desired to release the latch 34 from the rack 35 an end thrust is given to the plunger 37, which will swing the link 38 on its pivot point and elevate the latch 34. The latch 32 is likewise controlled by a lever 40, the lower end of which is pivoted to the lever 31 and extends upwardly to a point adjacent the handle 36, the extreme upper end of the lever being bent to a horizontal position to form a gripping portion 41, said gripping portion extending parallel with the handle section 36 so that when it is desired, both the handle and gripping section can be grasped and operated simultaneously and as the latch 32 is secured to the lever 40, the movement of the gripping portion of said lever in juxtaposition to the handle 36, will release the latch 32 from the rack bar 33 and when it is desired to hold the latch 32 out of engagement with the rack bar 33, as when the reach bar and parts carried thereby are to be operated by the foot lever, or power lift, the latch 32 is held out of engagement with the rack bar 33 by securing the upper end of the lever 40 in juxtaposition to the handle 30 by means of a hook 42, which hook is extended around the protruding end of the plunger 37 and has its hook portion in position to engage the gripping portion 41 of the lever 40. The reach bar is also adapted to be elevated by power lift by the rotation of the wheels 6 and to accomplish this result, the drums 12 have secured thereto ratchet wheels 43, with which are adapted to engage pawls 44, carried at the ends of a rod 45, said rod being rotatably mounted in openings in the arms 22 and adjacent the reach bar 21, said pawls being normally held out of engagement with the ratchet wheels 43 by means of springs 46, said springs being wound around the rod 45 and having one of their ends secured thereto, while their opposite ends are secured to the reach bar 21.

In order to partially rotate the rod 45 and move the pawls into engagement with the ratchet wheels 43, a trip bar 47 is fixed to the rod 45 and extended forwardly therefrom, the free end of the trip bar being connected to a treadle 48 on the operating shaft 25 by means of a link 49, the treadle 48 having an extension 50 thereon, to which the upper end of the link 49 is secured and in order to hold the treadle in position on the shaft 25 and permit the same to move a distance independently of said shaft, the treadle 48 is provided with a slot 51, through which extends a pin 52 carried by the shaft 25 and by forming the slot of sufficient length, the treadle 48 may be moved forwardly to bring the pawls into engagement with their respective ratchet wheels without effecting the operation of the shaft 25 and it will likewise be seen that the treadle may be reversely moved to release the pawls from their respective ratchet wheels without effecting the operation of the shaft 25.

The rear end of the trip bar 47 is provided with an extension 53, which extension is adapted to pass below the reach bar 21 and limit the rearward swinging movement of the pawls 44 and by this means it will be seen that the pawls will be held in position to readily engage the ratchet wheels when the treadle is swung forwardly.

The lower ends of the shanks 14 have secured thereto keepers 54, the upper ends of said keepers terminating in guards 55, which guards are curved rearwardly and forwardly to conform to the curve of the shank 16 and the edges of said guards are also tapered and terminate in a point at their upper ends, whereby grass, etc., will readily pass over and around the guards and fall into the furrows made by the shovels 54ª secured to the lower ends of the guards.

In order to prevent undue breaking of the pins 20, as when the shovels engage solid objects, the beams 14 are yieldingly secured to the reach bar 21 by extending hanger rods 65 through the horizontal portion of the reach bar and pivotally securing the lower ends of the hanger rods between the two sections forming the beams, so that said beams may be moved upwardly a short distance when the shovels encounter solid objects and in order to normally hold the shovels in engagement with the soil, springs 66 are disposed around the rods 65 between the reach bar 21 and beams 14, the tension of said springs being such as to hold the shovels in engagement with the soil under normal circumstances.

If the beams are to be elevated by power lift, the lever 31 and parts attached thereto are placed in the same position as when the beams are to be raised by the foot lever and when it is desired to raise said beams, the operator directs forward pressure on the treadle 48, which, in view of the slot 51 will rotate on the shaft 25 and bring the pawls into engagement with the teeth on the ratchet wheels 43, when the forward movement or rotation of the wheels 6 will elevate the reach bar and beams carried thereby. Co-incident, however, to the engagement of the pawls with the ratchet wheels, the end of the slot 51 will have engaged the pin 52 and slightly rotated the shaft 25 to move the sections of the suspension bars 23 out of alinement with each other, thereby permitting the reach bar and beams to ascend.

When the reach bar has been elevated to its full stroke, the forward portion of the trip bar 47 will engage the frame 1 and swing the pawls 44 out of engagement with the ratchet wheels 43, thereby permitting the reach bar and beams to again descend unless it is desired to retain the same in an elevated position, in which case the operator places his foot against the lever 30 and holds the reach bar and beams in their elevated position. If, on the other hand, the beams are to be elevated by hand, the lever 31 and latches thereon are brought into operation, said lever 31 being first swung rearwardly the proper distance and the lever 40 released from the hook 42, thereby permitting the latch 32 to engage with the teeth on the rack bar 33 and when it is desired to elevate the beams and reach bar the plunger 37 is operated to release the latch 34 from the rack bar 35 when the lever 31 is swung forwardly and as the latch 32 is engaged with the rack bar 33, the shaft 25 will be rotated and the reach bar and beam secured thereto, elevated and if it is desired to hold the beams in an elevated position, pressure is released from the plunger 37 and the latch 34 permitted to engage the teeth on the forward portion of the rack bar 35, thereby holding the beams in their elevated positions until such time as the latch 34 is again disengaged from its rack bar.

When the parts are operated by hand, it will also be seen that the movement of the beams may be readily regulated by engaging the latch 32 at various points on the rack bar 33, as when the latch is engaged with the teeth at the rear end of the rack bar and the lever moved forwardly its full stroke, the beams will be elevated to their full height, but should the latch be engaged with notches farther forward on the rack bar, the beams 14 will be raised to a less height.

Instead of employing the form of shank herein shown and attaching a shovel thereto, that form of shank disclosed in my former application Serial No. 38,562, filed Aug. 1st, 1907 and allowed Jan. 8, 1908, may be used instead, the operation of the various parts of the device being the same in both instances.

It will thus be seen that I have provided a device that may be operated in various ways to elevate the cultivator beams and parts carried thereby out of engagement with the earth's surface.

It will further be seen that by providing the cleaning device, grasses and like rubbish will be removed from engagement with the shanks and shovels; when the beams carrying the shanks are elevated and it will likewise be seen that by constructing the shovel in the manner shown, the cleaning devices will be separated to pass along the edges of the shovels and at the same time permit the grass, etc., removed by the shovel to pass over the top thereof and remain in the furrow made by the shovel.

What I claim is:

1. In a cultivator attachment, the combination with a frame, a tubular shaft carried by said frame, an axle extending through said shaft and wheels on said axle; of a reach bar, means to pivotally secure said reach bar to said tubular shaft, beams extended from said reach bar, means to yieldingly secure said beams to said reach bar, an operating shaft rotatably mounted on said frame, suspending bars, means of connection between said suspending bars and said operating shaft, means for pivotally supporting said suspension bars, said pivotally supporting means being connected to said reach bar, said suspension bars being formed in sections and pivotally connected together, means on one of said sections adapted to engage the opposite section and limit swinging movement of said sections and additional means engaging the operating shaft to rotate the same whereby the reach bar and beams carried thereby may be elevated.

2. In a cultivating device of the class described, the combination with a frame having a tubular shaft thereon; of a reach bar, beams suspended from said reach bar, means to pivotally connect said reach bar to said tubular shaft, means for yieldingly suspending said beams from said reach bar, an operating shaft rotatably mounted on said frame, suspension bars, means of connection between said suspension bars and said operating shaft, means for pivotally supporting said suspension bars, said pivotally supporting means being connected to said reach bar, said suspension bars being formed in sections, the end of one of said sections being bifurcated to receive the end of the opposite section, means for limiting swinging movement of said sections in one direction, coöperating with said operating shaft, whereby said shaft may be rotated manually or by power lift, for elevating said reach bar and beams secured thereto.

3. In a cultivating device, the combination with a frame having a tubular shaft thereon, beams carried by said shaft, a reach bar for said beams, arms extending between said reach bar and tubular shaft and means to yieldingly secure the beams to the reach bar; of an operating shaft rotatably mounted on said frame, means of connection between said operating shaft and said reach bar, suspension bars, said suspension bars being formed in sections and hingedly secured together, means to limit the swinging movement of said sections in one direction, a rack bar on one of said suspension bars, a lever pivotally mounted on said operating shaft, a latch on said lever adapted to coöperate with the rack bar, a controlling lever for said latch, a rack bar adjacent the first mentioned rack bar, a latch also carried by the first mentioned lever adapted to coöperate with the last mentioned rack bar, means to operate the last mentioned latch and additional means to secure the first mentioned latch out of engagement with its respective rack bar when the first mentioned latch is not in use for rotating the operating shaft.

In testimony whereof I have signed my name to this specification in the presence of two subscribing witnesses.

CHARLIS W. STARK.

Witnesses:
ABR. JANZEN.
C. C. WIEBE.